E. P. BAIRD.
TOLL TELEPHONE SYSTEM.
APPLICATION FILED JULY 12, 1902. RENEWED MAR. 10, 1906.

1,149,614.

Patented Aug. 10, 1915.
4 SHEETS—SHEET 3.

Witnesses:
Emma Gerlach
Alberta Adamiek

Inventor.
Edward P. Baird
By Fred Gerlach
his Attorney.

COLUMBIA PLANOGRAPH CO., WASHINGTON, D. C.

E. P. BAIRD.
TOLL TELEPHONE SYSTEM.
APPLICATION FILED JULY 12, 1902. RENEWED MAR. 10, 1906.

1,149,614.

Patented Aug. 10, 1915.
4 SHEETS—SHEET 4.

Fig. 9.

Witnesses:
Emma Gerlach
Alberta Adamick

Inventor:
Edward P. Baird,
By Fred Gerlach
his Attorney.

UNITED STATES PATENT OFFICE.

EDWARD P. BAIRD, OF EVANSTON, ILLINOIS, ASSIGNOR TO BAIRD MANUFACTURING COMPANY, OF CHICAGO, ILLINOIS, A CORPORATION OF ILLINOIS.

TOLL-TELEPHONE SYSTEM.

1,149,614. Specification of Letters Patent. Patented Aug. 10, 1915.

Application filed July 12, 1902, Serial No. 115,273. Renewed March 10, 1906. Serial No. 305,308.

*To all whom it may concern:*

Be it known that I, EDWARD P. BAIRD, a resident of Evanston, in the county of Cook and State of Illinois, have invented certain new and useful Improvements in Toll-Telephone Systems, of which the following is a full, clear, and exact description.

The invention relates to telephone systems, and more particularly to those systems for the use of which a toll is charged, as distinguished from those for which a periodical rental is paid.

It is now common practice to associate devices known as "registers" and as toll-receivers, with telephone-systems. When toll-receivers are employed, the deposit of a coin is required before the service desired is given. When a register is employed the register records each use of the telephone and tolls in accordance with the record of the register, are paid periodically. In some of the systems now in use, it is customary to permit the patron to call central office without prepayment of toll. When the central operator has ascertained that the desired service can be given, the patron deposits a coin into the toll-receiver, or operates the register, and by a distinctive signal the central operator is notified of such operation. An objection to this system is that the central operator is obliged to wait until the patron has performed such operation, and furthermore, the called subscriber is also obliged to wait until the central had made connection between the substations, after notification by the distinctive signal.

In another type of toll-telephone-systems, prepayment or operation of the register is necessary to permit the actuation of the call-signal at the central office, so the exchange-operator is not obliged to wait for the patron to deposit a coin or operate the register. In such system, means were usually provided whereby the coin could be refunded, in event the desired service could not be given. When a register was employed with such system, it was necessary to provide means whereby the patron is credited with a call or means whereby the register could be reversely operated. When toll-receivers are employed, the coin is sometimes placed beyond control of the patron by the central operator and in another system, such displacement of the coin is effected by the patron, and the central operator is notified of the withdrawal by a signal. In another system, the deposited coin is detained in the toll-apparatus until the release thereof is effected or permitted by the central operator. In all of these systems, some operation or action of the central-operator was necessary which resulted either in delayed service, or some operation by the central-operator which resulted in delay in responding to other calls.

A desideratum in the operation of toll telephone systems has been to provide a system in which no operation or action by the central operator is necessary which results in delayed service and in which the operation by the central-operator is similar to that necessary in systems with which no toll-apparatus is associated.

A resultant advantage of such system, is that no additional service by the operator is necessary and the association of the toll-apparatus with the line does not result in any delay in the service. Furthermore, in any exchange including terminals of toll telephone-lines and lines paid for by subscription, the operations, in so far as the exchange-operator is concerned, are identical and no confusion will arise.

One object of the present invention is to provide a toll-telephone system, in which the necessity of the control of the toll-apparatus by the central operator is avoided in which the necessity of waiting for a signal is avoided, and in which no delay in the service is occasioned by the toll-apparatus and the operation thereof.

Another object of the invention is to provide an improved toll-telephone-system, and the invention also designs to improve the construction arrangement and operation of apparatus associated with toll-telephone-lines.

The invention consists in the several novel improvements and features hereinafter set forth and more particularly defined by claims at the conclusion hereof.

Figure 1:
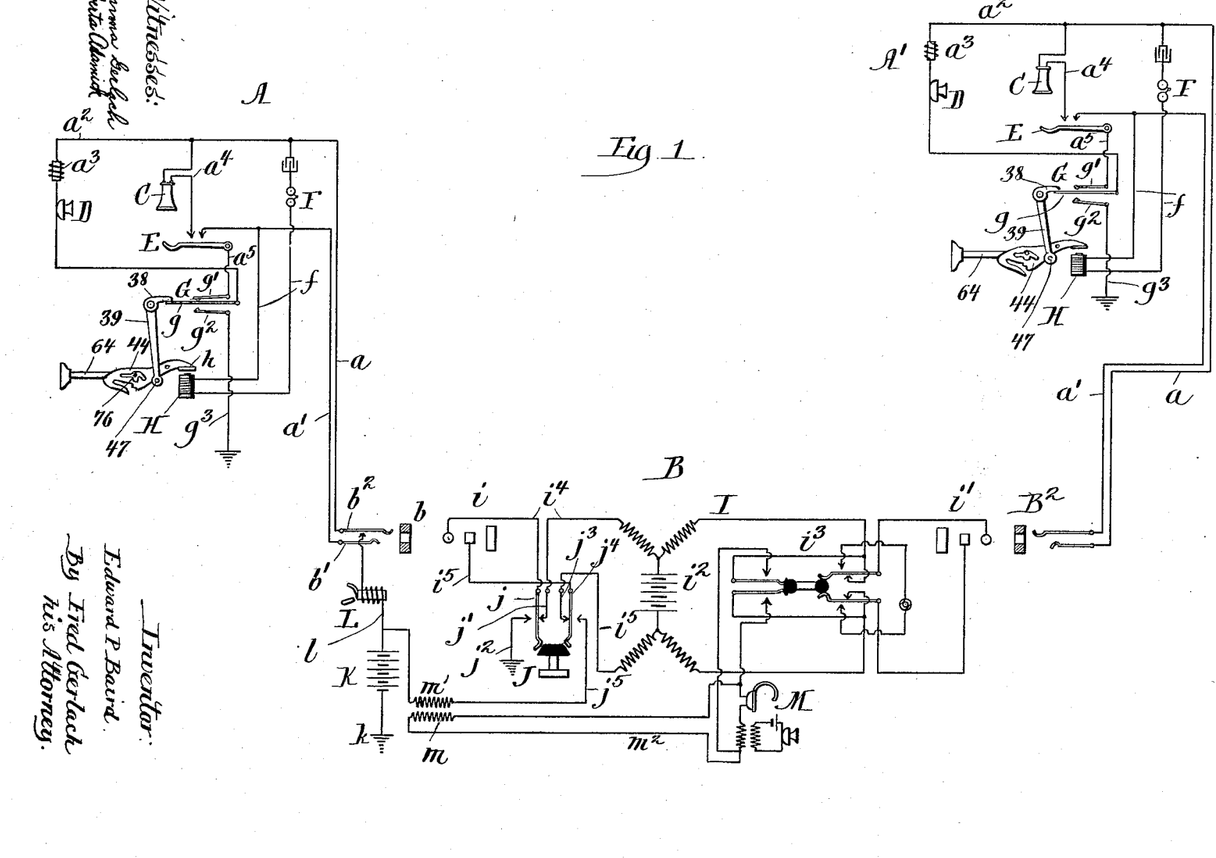
Figure 1 is a diagrammatic view of a telephone-system embodying the invention.

Referring more particularly to Fig. 1 of the drawings, A and A′ denote substations connected with a central exchange B by telephone-lines. Each substation is provided with a telephone-set comprising a receiver C, a transmitter D, switch-hook E, a call-signal F of usual construction and other usual parts as well understood in the art. Each telephone-line includes a branch conductor $a'$ extending from a contact-spring $b'$ of spring-jack $b$ of a switch-board at the exchange to the substation, and terminates there in a contact adjacent switch-hook E. Each telephone-line also includes a branch-conductor $a$, extending from a contact-spring $b^2$ of the spring-jack of the switchboard to the substation and terminating there in a contact-spring $g$ of a coin-controlled switch G of the toll-apparatus. Transmitter D at each substation is included in a branch $a^2$ of line-conductor $a$ and a retardation-coil $a^3$ is also included in said conductor. Receiver C is included in a branch-conductor $a^4$ extending from line-conductor $a$ and terminating in a contact at switch-hook E. A conductor $a^5$ extends from the switch-hook to a contact-spring $g'$ of switch G of the toll-apparatus. A contact-spring $g^2$ is arranged in position to be engaged by contact $g$ of switch G and is connected with ground by a conductor $g^3$. Switch G is controlled by mechanism hereinafter described. Call-signal F is included in a conductor $f$ which bridges the line-conductors $a'$ and $a$ and a releasing-relay H of the toll-apparatus is included in conductor $f$ so the relay will be energized when the call-signal is actuated.

Switch G and the several contacts thereof are arranged so the telephone-line will be normally closed, thereat, and so communication can be interrupted, and also so one branch of the line can be grounded to provide a circuit for telephonic communication between the substation and central-office, but which will not permit communication with another substation until the coin-controlled switch has been again shifted by the depositor. When contacts $g$ and $g'$ are in normal or closed position the line will be in condition for telephonic communication with a distant station when proper connection is made at the exchange. In-coming calls are usually furnished without charge, and the telephone-line is normally in condition to permit the telephone to be used without shift of switch G when the call originates at another substation. When contact $g$ is held in engagement with grounded spring $g^2$ (by means hereinafter described) a grounded circuit is established whereby communication for speech-transmission is established between the exchange and the substation and whereby communication between two substations will be interrupted until the coin which has been deposited to effect the actuation of the line-signal, is placed beyond control of the depositor. When contact $g$ is between springs $g'$ and $g^2$ and out of contact therewith, (which position is assumed when the deposited coin is withdrawn), the telephone-line is open at switch G and the line is inoperative for speech transmission.

Central-exchange B is equipped with a cord-loop I comprising usual plugs $i$, $i'$, a centralized battery $i^2$ and a combined listening and ringing-key $i^3$, which are electrically connected by conductors in manner shown. The cord-circuit includes also a key-switch J comprising normally closed contacts $j$ and $j'$ interposed in a conductor $i^4$, extending from battery $i^2$, to the tip of plug $i$. A grounded conductor $j^2$ has a contact-terminal in position to connect spring $j$ with ground. A conductor $i^5$ extends from the other side of battery $i^2$ to the sleeve of plug $i$ and normally closed contact-springs $j^3$ and $j^4$ are included in such conductor. A conductor $j^5$ having a contact-terminal arranged to be engaged by spring-contact $j^4$ is connected with a battery K which is grounded as at $k$.

The operator's telephone-set M is connected as shown and in usual manner with key $i^3$. A section $m'$ of an induction-coil is interposed in conductor $j^5$, and a coil $m$ is correspondingly arranged in a branch-conductor $m^2$, which is also connected with the operator's telephone set M as shown. The purpose of providing key J and the associated connections is to provide a circuit over which telephonic-communication can be had between the exchange and the substation and from which the other side of the cord-circuit or the other cord-plug will be excluded. "Listening-key" $i^3$ permits the operator to connect telephone M with the line in usual manner and without interrupting communication between the substations.

A line-signal L of usual construction is included in a conductor $l$ extending from ground to battery K and thence to a contact-terminal normally engaged by one of the contact-springs of spring-jack $b$ and is arranged to be disconnected therefrom when a plug is inserted into the jack.

The apparatus associated with the improved system is illustrated more particularly in Figs. 2 to 9 inclusive. A case 15 of any suitable construction and having an open back and containing the toll-device and parts operated and controlled thereby is usually secured to the back-board of a telephone, so audible signals (if any are used) produced by the toll-apparatus will be conducted over the telephone-line to the central-exchange. Within the case, a compartment or receptacle 16 retains the collected coins and a door 17 secured by a lock 18 permits removal of the coins by authorized persons. The operating-mechanism of the toll-device is sustained by a support or frame comprising side-walls 20 and 21, secured to a horizontal wall 19.

A coin-receiving slot 22 is formed in the top-wall of the case. A manually-actuated coin-carrier 14 is pivotally sustained by a rod 24 held in the walls 20, 21 of the frame. Coin-carrier 14 is normally inclined and is provided with a coin-channel 13 extending entirely therethrough, and with a lever 25 extended through a slot 26 in the case. A stop 27 located in coin-channel 13 holds a coin of proper size in the carrier, while a coin of smaller size will pass therethrough, and into coin-compartment 16. A notch 28 formed in the carrier and adjacent the front or upper edge thereof, exposes a portion of a coin for engagement with the coin-controlled mechanism hereinafter described.

The distal terminal of lever 25 is located outside of the case, so the depositor can shift the carrier. Lever 25 is provided with wings 29, which obstruct lever-slot 26 and prevent the insertion of articles therethrough, and also obstruct the receiving-slot when the carrier is not in normal position. Coins are positively shifted by the carrier to effect positive shift of the coin-actuated or controlled parts of the toll-apparatus.

A spring 30 imparts reverse movement to the coin-carrier and retains the carrier normally in position to receive a coin inserted through the receiving-slot 22. A dog 31, pivotally sustained by a cross-rod 32, is provided with a series of teeth, and is pressed normally into position shown in Fig. 2, and into the path of travel of a coin in carrier 14, by a spring 32'. The teeth of dog 31 are engaged by the coin during the descent of the carrier and prevent retraction of the carrier, until the carrier and coin have passed below the dog and the coin has been discharged. Spring 32' engages dog 31 and holds an extension of dog 31 against stop 34 which is secured to wall 20. A coin discharged from the carrier will gravitate into a distributer-mechanism, being directed thereto by a guide or wall 35.

The apparatus is designed to require the deposit of a coin before the "line-signal" at the central station is actuated, and to refund the coin, if the desired service cannot be given. A coin-distributing-mechanism is provided whereby a coin will be temporarily retained and whereby the coin will be displaced into compartment 16 or refunded to the depositor. The coin-distributer-mechanism (see Fig. 2) comprises a chute 50 pivotally sustained at 51 in the side-walls of the frame, and a coin-rest 52 positioned normally beneath the chute, and sustained by arms 53 pivotally sustained at 54. A passage 55 at the rear of rest 52 directs a coin into coin-compartment 16, when chute 50 is shifted to displace the coin. If desired, an opening and translucent plate 12 may be provided to display a coin held in chute 50, so a bogus coin can be detected. A guide 56 beneath rest 52 directs a coin from chute 50 (when rest 52 is shifted) through an exit 57 and into a receiver 58, secured to the outside of the front wall of the case.

Figure 2:
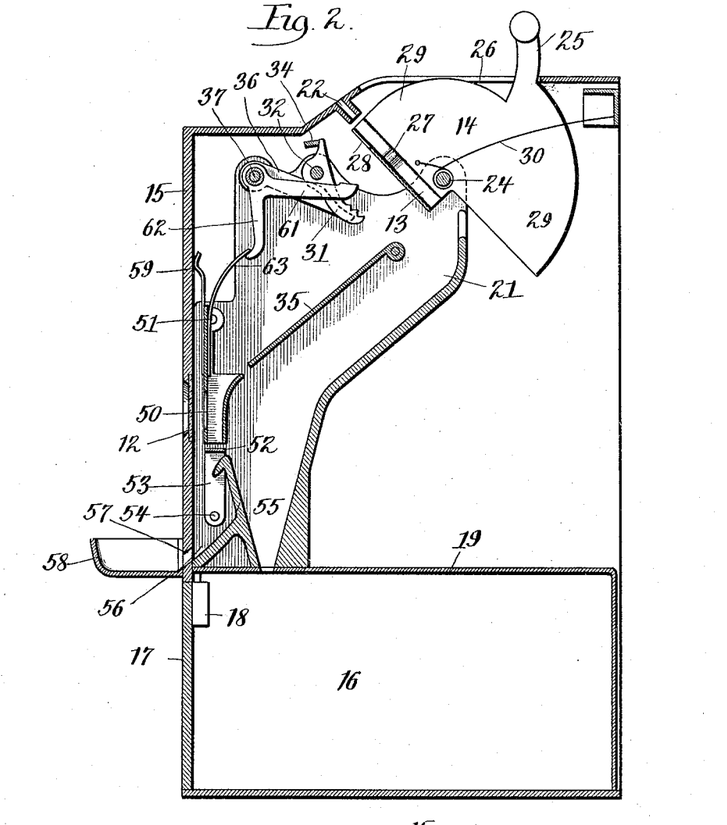
Fig. 2 is a view in central vertical section of a toll-apparatus which is associated with the telephone-line.
Figure 3:
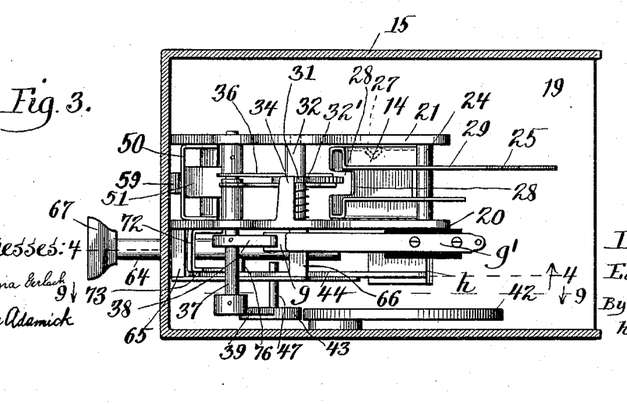
Fig. 3 is a plan view of the toll-apparatus, the inclosing case being shown in section.
Figures 4, 5, 6, 7, 8:
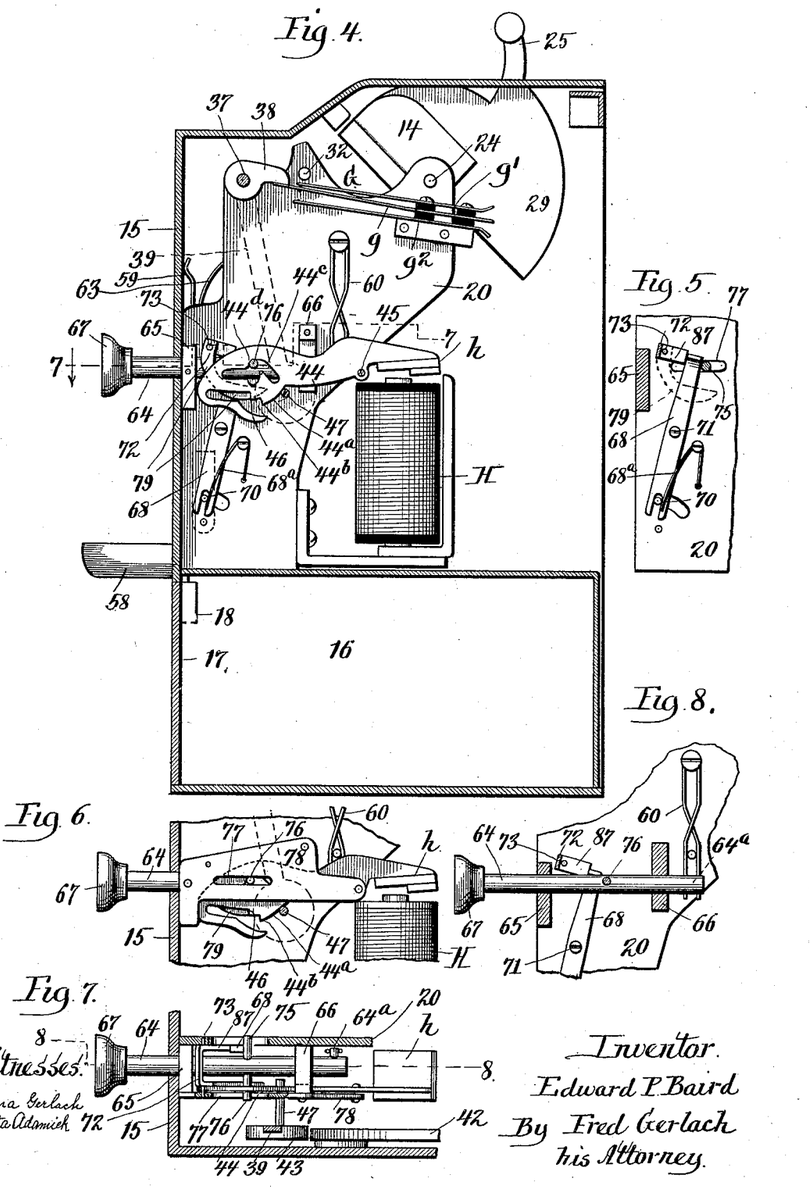
Fig. 4 is a view in vertical section taken on line 4—4 of Fig. 3.
Fig. 5 is a detail view showing the means for securing the coin-distributer-mechanism and preventing withdrawal of a deposited coin.
Fig. 6 is a detail view in side elevation of a portion of the frame and the parts secured thereto.
Fig. 7 is a detail view in horizontal section taken on line 7—7 of Fig. 4.
Fig. 8 is a detail view in vertical section taken on line 8—8 of Fig. 7.
Figure 9:
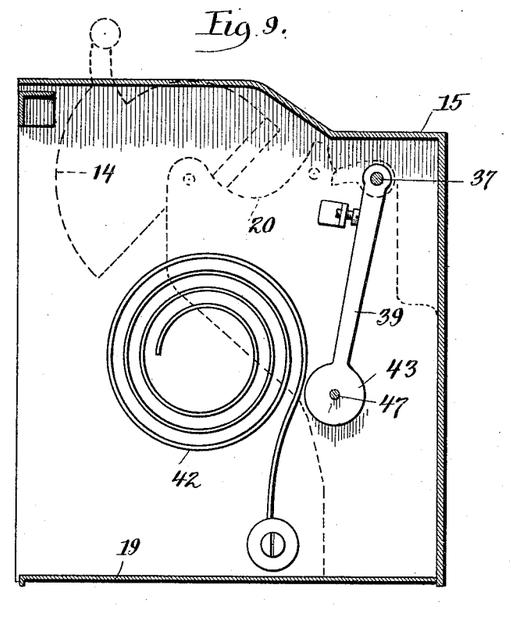
Fig. 9 is a view in vertical section taken on line 9—9 of Fig. 3.

A spring 59 retains chute 50 in normal position above rest 52 (see Fig. 2). Displacement of a coin into coin-compartment 16 is effected manually by the shift of the carrier during the transit of the next deposited coin to the distributer-mechanism, i. e., a deposited coin for which service has been given remains in the distributer-mechanism until another coin is deposited, and during the transit of the latter coin to the distributer-mechanism the previously deposited coin will be displaced into coin-compartment 16. The mechanism for shifting the coin-chute to displace a coin into coin-compartment 16 comprises a bell-crank-lever sustained by a cross-shaft 37 and having an arm 61 extending normally into the path of movement of a coin in the carrier, and an arm 62 engaging a slightly flexible extension or strip 63, secured to distributer-chute 50. Arm 61 is engaged by a coin during the initial part of the downward shift of coin and carrier.

The operation of the mechanism for displacing coins into the coin-compartment, will be as follows: A coin held in the carrier will, during the initial part of the shift thereof, engage arm 61 and shift arm 62 of the bell-crank-lever, and swing the chute rearwardly against the force of spring 59, and into position to remove the previously deposited coin (if any) from rest 52 into passage 55 and thence into the coin-compartment. As the coin in the carrier engages arm 61 only during the initial part of the downward movement of the carrier, arm 61 will be released and spring 59 will restore distributer-chute 50 to normal position before the coin is discharged from the carrier. During each deposit of a coin, and its transit to the distributer-mechanism, the distributer-mechanism will be operated to displace a previously deposited-coin (if any), into the coin-compartment, and the distributer-chute will be restored to normal position in readiness to receive the last deposited coin. A coin inserted by a depositor desiring service, will be retained in the distributer-chute. If the desired telephonic-connection is made, the coin remains in the distributer-chute and is secured therein against withdrawal by means hereinafter described, until displacement into the coin-compartment by the succeeding operation of the carrier.

A shifter-arm 36 projecting normally into the path of travel of a coin in the carrier, is secured to cross-shaft 37. Shaft 37 extends through side-wall 20 of the frame, and has secured thereto, a switch-arm 38 of insulating material. Switch-arm 38 engages spring-contact $g$ of switch G and controls the position thereof. When switch-arm 38 is shifted by a coin, the arm will cause spring $g$ to engage contact-spring $g^2$ and complete a signal-circuit wherein the line-signal is included. A latch 44 pivotally sustained at 45 is provided with a hook 46 which is arranged to engage an inwardly projecting stud 47 of a lever 39 and to retain said stud, lever 39, switch-arm 38 and contact-spring $g$ in shifted position to cause or permit the actuation of the line-signal. Latch 44 is provided with a cam-edge $44^a$, whereby the latch will be lifted by stud 47, as the stud is shifted into position to retain the stud and lever 39. Latch 44 is also provided with a notch or hook $44^b$, which is positioned to hold the stud in such position that contact-spring $g$ will be held between contacts $g'$ and $g^2$ and out of contact therewith. The telephone-line will then be interrupted or open at switch G and will be inoperative. The switch assumes such intermediate position upon withdrawal of a coin which has been deposited to cause the actuation of the line-signal at the central office.

The manually operated mechanism for effecting withdrawal of a coin comprises a rod 64 mounted in manner free to slide in lugs 65 and 66 of the frame, and a handle 67 secured to the front terminal of rod 64, and whereby the rod may be shifted. A lever 68 pivotally sustained as at 71 and having its lower end connected by a stud and slot 70 to one of the arms 53 of the movable coin-rest 52, serves to effect the shift of said coin-rest when rod 64 is shifted forwardly. A spring $68^a$ restores lever 68 and connected parts to normal position after shift thereof. Rod 64 is free to be shifted forwardly and backwardly of the normal position seen in Figs. 4 and 8, and is yieldingly held in normal position and restored thereto, after shift in either direction by a centralizing spring 60 having each of its free terminals engaging a stud $64^a$, projecting inwardly from rod 64 (see Figs. 7 and 8).

A locking-dog 72 is pivotally sustained in the frame as at 73 and secures lever 68 against shift in that direction in which withdrawal of the coin is effected. An arm 87 of dog 72 is arranged to obstruct the path of movement of the upper end of lever 68, and thus prevent shift thereof. An arm or extension 79 of dog 72 is arranged to be engaged and lifted by stud 47 of lever 39 to effect the shift of arm 87 of the dog out of the path of movement of lever 68 when a coin is to be withdrawn. Such means also retains the locking-dog in position to release lever 68 while the coin-controlled switch G is in position to cause actuation of the line-signal. Arm 79 of dog 72 is formed to permit the dog to pass into locking-position when stud 47 and switch-arm 38 are either in normal position or in intermediate position and so the coin can only be withdrawn while the switch is in position to cause actuation of the line-signal. Rod 64 is provided with studs 75 and 76 guided in slots 77, formed in side-walls 20 of the frame and in a plate 78 secured to lugs 65 and 66 of the frame. Stud 75 projects inwardly and is positioned to engage and shift the upper terminal of lever 68 of the coin-rest. Stud 76 projects outwardly and through a cam-slot formed in latch 44. Said slot is formed with an angular portion $44^c$ which will cause the latch to be lifted a sufficient distance to release stud 47 and permit said stud and switch G to be restored to normal position when rod 64 is shifted inwardly. An abutment $44^d$ is also formed in the cam-slot and causes latch 44 to be lifted sufficiently to permit stud 47 to pass into and be arrested by notch $44^b$ of the latch, and so the stud will cause contact $g$ of switch G to be held in its intermediate position and out of contact with springs $g'$ and $g^2$, when rod 64 is shifted forwardly to withdraw a deposited coin.

Lever 39 is provided with a hammer 43 which engages a gong 42 and produces an audible signal which is conducted over the telephone-line to the central-operator upon release of stud 47 by the latch when the depositor shifts rod 64 to place the coin beyond his control. Such signal is produced simultaneously with the release of switch G into position to render the telephone-line operative between the substations and after connection has been established at the central exchange.

Releasing-relay H comprises an armature $h$ secured to latch 44. When the helix of said relay is energized, latch 44 will be shifted to free stud 47 from latch 44 and permit switch G to restore the telephone-line to normal condition. Such shift of the latch is only necessary when the patron does not obtain the service desired, and withdraws a deposited coin. Relay H is included in the bridge-circuit $f$ in which the call-signal F is included, so the telephone-line will be automatically restored to normal condition in readiness for an in-coming call. If the switch G remains in its intermediate position when a connection is again desired, the shift of the coin-carrier will shift the switch into position to close the signal circuit from the intermediate position.

The operation of the improved telephone-system and toll-apparatus will be as follows: Assuming the line to be in normal condition (out of use) and the toll-apparatus in normal position shown in the drawings, a patron desiring a telephonic-connection will deposit a coin of proper denomination into the toll-receiver. The deposited-coin will pass into coin-carrier 14 and the depositor will next shift the carrier to discharge the coin into the distributer-mechanism. In transit to the distributer, the coin in the carrier will operate the distributer-chute 50 and displace a previously deposited coin (if any) into compartment 16, as hereinbefore described, and also engage arm 36 and rock shaft 37, and shift lever 39 in position to be held by hook 46 of latch 44. Switch-arm 38 will then be in position to hold contact-spring $g$ in contact with spring $g^2$, and complete a grounded circuit for the actuation of the line-signal at the central office, to notify the central-operator of the deposit of a coin and that service is desired. When the deposited coin is held in the distributer-mechanism and lever 39 is in said shifted position, stud 47 will engage arm 79 of locking-dog 72, and hold said dog in lifted position, so lever 68 of the distributer will be free to be shifted by rod 64. Therefore, if the telephone-line is out of order, so central-office cannot be communicated with, the depositor can withdraw the coin. When switch G has been shifted by a deposited coin and the coin has been displaced into the distributer chute, the line-signal will be actuated by passage of current over a circuit, as follows, viz: ground at $k$, at central office, to battery K, conductor $l$ wherein line-signal L is included, contact-spring $b^2$ of spring-jack $b$, line-conductor $a$, contact-springs $g$ and $g^2$ of switch G, and conductor $g^3$ to ground. Line-signal L being then actuated, the central-operator will be notified that a coin has been deposited in readiness to be placed beyond control of the depositor, and that a connection is desired. Thereupon the central operator will insert answering plug $i$ into spring-jack $b$, thus excluding the line-signal from line, and will also shift key J to establish communication with the subscriber. With said key in shifted position and plug $i$ in spring-jack $b$, circuit for transmission of speech between the calling substation and central office will be established as follows, viz: ground $k$, conductor $l$, battery K, induction-coil $m'$, conductor $j^5$, spring $j^4$ of key-switch J, conductor $i^5$, the sleeve of plug $i$, spring $b^2$ of spring-jack $b$, line-conductor $a$, branch-conductor $a^4$, in which receiver C is included, switch-hook E, conductor $a'$, spring $b'$ of spring-jack $b$, the tip of plug $i$, conductor $i^4$, spring $j$ and conductor $j^2$ to ground. Current also passes through branch-conductor $a^2$, in which retardation-coil $a^3$ and transmitter D are included, springs $g$ and $g^2$ of switch G, and conductor $g^3$ to ground. The central-operator's telephone M will then be in communication with the substation by induction-coils $m$, $m'$ and conductor $m^2$, as well understood in the art. The central operator can then ascertain from the depositor the connection desired and next the operator ascertains whether or not the desired service can be given, in usual manner. If the desired service can be given, central-operator inserts plug $i'$ of cord-circuit I into the spring jack of the called substation and operates ringing-key $i^3$ as well understood in the art and thus notifies the called substation, and restores key-switch J to normal position. No further action is necessary upon the part of the central operator. Furthermore, it is not necessary for the central operator to wait until the person at the called-station responds. Nor is it necessary for the central operator to remain upon the line to ascertain whether or not the depositor places the coin beyond his control, because the telephone-line is not placed in condition to establish complete telephonic-communication between the two substations until the depositor places the coin beyond his control. When the person at the called substation responds to the call, such response can be heard by the person at the calling-station but the person at the calling substation cannot communicate with the person at the called station because the transmitter of the telephone-set at the substation at which the call originates is excluded from the circuit. The circuit whereby the person at the calling station will be informed of the response to the call of the person at the called station will be as follows, viz: Current will pass from the centralized battery $i^2$, conductor $i^5$, springs $j^3$ and $j^4$, of key-switch J, conductor $i^5$, sleeve of plug $i$, spring $b^2$ of spring-jack $b$, line-conductor $a$, conductor $a^4$, wherein telephone-receiver C is included, switch-hook E, line-conductor $a'$, spring $b'$ of spring-jack $b$, the tip of plug $i$ and conductor $i^4$, wherein springs $j$, $j'$ are contained, back to battery $i^2$.

It will be understood that the circuit for speech transmission between the called station and the central office will be complete. The telephone-transmitter at the calling-station being excluded from the line, prevents the transmission of speech from the calling station to the called station. As soon however, as the depositor hears the response of the called station through receiver C, he will know that connection has been made as desired, and will thereupon push rod 64 inwardly to place the coin beyond his control, and to complete the circuit for speech transmission between both substations. Inward shift of rod 64 will cause stud 76 to engage inclined portion $44^c$ of the cam in the latch, and lift said latch to effect the release of stud 47, lever 39 and switch-arm 38. Stud 47 will then return to normal position and locking-dog 72 will thereupon be released and again secure lever 68 against shift thereof, to effect withdrawal of the coin. Simultaneously, switch-arm 38 will pass into normal position and permit the spring $g$ of the coin-controlled switch to engage spring $g'$ and restore the telephone-line to normal condition. Current for the transmission of speech from the calling station will then pass also through conductor $a^2$ in which transmitter D is included, springs $g$, $g'$ of the coin-controlled switch, conductor $a^5$, and switch E to line-conductor $a'$. The transmitter D at the calling substation then will be operative for the transmission of speech.

Thus it will be seen that the completion of the circuit for speech-transmission between the two substations is dependent upon the deposit of a coin or placing of a coin beyond the control of the depositor. Furthermore, it will be seen that the coin controlled-switch serves as an interrupter for the line employed for speech-transmission, which can be shifted to place the telephone-line in condition for speech transmission between the two substations at the will of the depositor. Furthermore, it is manifest that the central operator is not delayed at any time by the necessity of waiting for the depositor to shift the coin-controlled switch, or even until the called subscriber responds to the call, because the calling-subscriber is informed of the response of the called station through the telephone-receiver.

The purpose in providing a confirmatory audible signal is to provide means for protecting the use of fraudulent means to establish the ground necessary at the substation to effect the actuation of the line-signal at central office. Ordinarily, the central operator will rely upon the coin-controlled switch, but if at any time the operator is at leisure and desires to verify the operation of the coin-controlled switch, and the position of the coin beyond the control of the depositor, such can be done by employing the usual listening-key $i^3$. This listening-key permits the central operator to listen upon the line in usual manner and can hear the audible signal produced by hammer 43 and gong 42, upon release of the spring $g$ of the coin-controlled switch, and the restoration of such spring to normal position which occurs at the time the deposited coin is locked into the distributer-mechanism. For example, if the ground had been established by fraudulent means, at the substation, the confirmatory audible signal would not be heard by the central operator who would then detect the fraudulent operation.

If the service desired by the depositor at the substation cannot be obtained or the desired service cannot be given, the central operator will inform the depositor either orally or by "busy" signal, as well understood in the art, that the desired connection cannot be obtained. The depositor will thereupon pull rod 64 outwardly. Such shift will cause stud 76 to engage abutment $44^d$, lift latch 44 a sufficient extent to cause stud 47 of lever 39 to pass into hook $44^b$ of the latch. The forward shift of the rod will cause stud 76 to engage lever 68 which will shift coin-rest 52 backwardly, so the deposited coin will gravitate and be directed into receiver 58. When stud 47 is held in hook $44^b$ of the latch, spring $g$ will be held between springs $g'$ and $g^2$, and out of contact therewith, so the telephone-line will be inoperative either for speech transmission or operation of the line-signal. As a result the depositor can obtain no further communication with central office until a coin has again been deposited. If the next time, the telephone is to be used, no call has originated at the substation, the latch and switch G will be restored to normal position by the actuation of the call signal. Current employed for operating the call-signal will pass from one of the line-conductors, through the call-signal and through the helix of releasing-relay H, and thence return to central office over the other branch conductor of the telephone-line. Thus it will be seen that when the telephone-line is left in inoperative condition, it will be automatically restored to condition for the transmission of speech upon the actuation of the call signal.

The term "coin" as used herein, is not to be understood as including only coins, but as including any toll-representing-token which may be employed in lieu thereof. While a toll-receiving apparatus has been shown and described as a part of the telephone-system, certain generic features of the invention may be readily employed in toll devices in which a token is not deposited, but in which the actuation of the switch or other means, is effected either by a toll-device or a register or recorder, and unless specifically restricted in the claims, these features are not to be understood as restricted to a system in which a toll-receiving-apparatus is employed.

The invention is not to be understood as restricted to the details of construction shown and described, but may be employed within wide limits without departing from the spirit of the invention.

Having thus described my invention, what I claim as new and desire to secure by Letters Patent, is:—

1. In a toll-telephone-system, the combination with a central-exchange, a substation and a telephone-line extending therebetween, said substation including transmitting and receiving instruments, of means for rendering both of said instruments operative for speech-transmission, between the calling station and the exchange a switch and connections in the main line at the substation for rendering one of said instruments inoperative for speech-transmission between the calling station and the called station independently of the other instrument, and a toll-device to which said switch is connected to render the inoperative instrument operative for speech-transmission.

2. In a toll-telephone-system, the combination with a central-exchange, a substation and a telephone-line extending therebetween, said substation including transmitting and receiving instruments, of a switch at the substation held normally in position to close the line, means at the substation for causing said switch to render one of the instruments inoperative for speech-transmission between the calling and a called station independently of the other of said instruments when said switch is in one position, means at the substation for holding said switch to interrupt the passage of current through one of said instruments when said switch is in another position and a toll-device for controlling said switch.

3. In a toll-telephone-system, the combination with a central-exchange, a substation and a telephone-line extending therebetween, said substation including transmitting and receiving instruments, of a switch at the substation held normally in position to close said line, means at the sub-station for rendering the transmitter inoperative for speech-transmission between the calling and the called station independently of the receiver, when said switch is in one position, means at the substation for holding said switch to interrupt the passage of current through one of said instruments when said switch is in another position, and a toll-device controlling the operation of said switch.

4. In a toll-telephone-system, the combination with a central-exchange, a substation and a telephone-line extending therebetween, said substation including transmitting and receiving instruments, of a line-signal at the exchange, a switch located at the substation and connected with said line, means at the substation for shifting said switch to establish a circuit which will cause actuation of the line-signal, means at the sub-station for rendering the transmitter inoperative for speech-transmission between a calling station and a called station independently of the receiver, and a toll-device controlling the operation of said switch and said means.

5. In a toll-telephone-system, the combination with a central-exchange, a substation and a telephone-line extending therebetween, said substation including transmitting and receiving instruments, of a line-signal at the central office, a switch located at the central office, a switch located at the substation and connected to said line, means for establishing a circuit to render both of said instruments operative for speech-transmission between the exchange and the substation, means for rendering one of said instruments inoperative for speech-transmission between a calling station and a called station independently of the other of said instruments when said switch is held in one position, means located at the substation and whereby one of said instruments will be rendered inoperative when said switch is held in another position, and a toll-device controlling the operation of said switch, and all of said means.

6. In a toll-telephone-system, the combination with a central-exchange, a substation and a telephone-line extending therebetween, said substation including transmitting and receiving instruments, of a line-signal at the central-exchange, a switch located at the substation connected with said line, means whereby said switch will be held normally in position to close said line, means whereby said switch may render one of said instruments inoperative for speech-transmission between a calling and a called station independently of the other of said instruments when said switch is held in one of its positions, means whereby said switch may be held to interrupt the passage of current through one of said instruments when said switch is held in another position, and a toll-device controlling the operation of said switch and all of said means.

7. In a toll-telephone-system, the combination with a central-exchange, a substation including transmitting and receiving instruments and a telephone-line extending therebetween, of a line-signal at the central-exchange, a switch located at the substation and connected to said line, means for shifting said switch to establish a circuit which will cause actuation of the line-signal, means whereby the central-operator can establish a circuit through both of said instruments for speech-transmission between the central-exchange and said substation while said switch is in position to cause actuation of the line-signal, means for rendering one of said instruments inoperative for speech-transmission between a calling and a called station independently of the other of said instruments, and a toll-device at the substation for operating said switch to restore it to normal position to establish a circuit which renders both of said instruments operative for the transmission of speech.

8. In a toll-telephone-system, the combination with a central-exchange, a substation including transmitting and receiving instruments and a telephone-line extending therebetween, of a line-signal at the central-exchange, a switch located at the substation and connected to said line, means for shifting said switch to establish a circuit which will cause actuation of the line-signal, means whereby the central operator can establish a circuit through both of said instruments for transmission of speech between the central-exchange and said substation, while said switch is in position to cause actuation of the line-signal, means for rendering one of said instruments inoperative for speech-transmission between a calling and a called station independently of the other of said instruments, means at the substation for restoring said switch to normal position to establish circuit which renders both of said instruments operative for the transmission of speech, and a toll-device controlling the operation of all of said means.

9. In a toll-telephone-system, the combination with a central-exchange, a substation and a telephone-line extending therebetween, the substation comprising transmitting and receiving instruments, of a switch at the central-exchange, a switch at the substation, means at the substation for rendering one of said instruments inoperative for speech-transmission between the calling and called station independently of the other, means at the central station for establishing a circuit for the transmission of speech between the central exchange and the substation when the switch at the central-exchange is shifted, means at the substation to place the line in condition to render one of the said instruments inoperative for the transmission of speech between the substations when the switch at the central-exchange is again shifted, and a toll-device controlling the operation of the switch at the substation.

10. In a toll-telephone-system, the combination with a central-exchange, a substation including transmitting and receiving instruments and a telephone-line extending therebetween, of a switch at the substation, means at the sub-station for rendering the transmitter inoperative for speech-transmission between a calling and a called station independently of the receiver, a switch at the central-exchange to establish a circuit for the transmission of speech between the central-exchange and the substation, and to place the line in condition to render both of said instruments operative for the transmission of speech when the switch at the substation is shifted, and a toll-device controlling operation of the switch at the substation.

11. In a toll-telephone-system, the combination with a substation, a central-exchange and a telephone-line, said substation including transmitting and receiving instruments, of means for rendering one of said instruments inoperative for speech-transmission between a calling and a called station, a "listening-key" at the central-exchange, a switch associated with said "listening-key" and to establish a circuit for the operation of both instruments at the substation when the central-operator shifts the "listening-key" to communicate with the substation, and a toll-device whereby the patron at the substation can restore the telephone-line to condition to permit intercommunication between the two substations.

12. In a toll-telephone system, the combination with an exchange, a substation including transmitting and receiving instruments, and a telephone line between the station and the exchange, of a toll device, means for preventing communication between the substation and the exchange by a subscriber at the substation until the toll-device has been operated, and means at the substation for independently rendering one of said instruments inoperative for speech transmission between the calling station and the called station, until said toll device has been again operated.

13. In a toll-telephone system, the combination with an exchange, a substation including transmitting and receiving instruments, and a telephone line between the station and the exchange, of a toll device, means for preventing communication between the substation and the exchange by a subscriber at the substation until the toll-device has been operated, and means at the substation for independently rendering the transmitter inoperative for speech transmission between the calling station and the called station, until said toll-device has been again operated.

EDWARD P. BAIRD.

In presence of—
 FRED GERLACH,
 EMMA GERLACH.

Copies of this patent may be obtained for five cents each, by addressing the "Commissioner of Patents, Washington, D. C."